(12) United States Patent
Sugie et al.

(10) Patent No.: US 12,517,624 B2
(45) Date of Patent: Jan. 6, 2026

(54) VEHICLE DISPLAY DEVICE AND IMAGE DISPLAY METHOD

(71) Applicants: DENSO CORPORATION, Kariya (JP); TOYOTA JIDOSHA KABUSHIKI KAISHA, Toyota (JP); J-QuAD Dynamics Inc., Tokyo (JP)

(72) Inventors: Akira Sugie, Kariya (JP); Naoyuki Okada, Kariya (JP); Kenji Kohara, Tokyo (JP); Hideaki Furuse, Kariya (JP); Yuki Yamamoto, Nagakute (JP)

(73) Assignees: DENSO CORPORATION, Kariya (JP); TOYOTA JIDOSHA KABUSHIKI KAISHA, Toyota (JP); J-QuAD Dynamics Inc., Tokyo (JP)

( * ) Notice: Subject to any disclaimer, the term of this patent is extended or adjusted under 35 U.S.C. 154(b) by 0 days.

(21) Appl. No.: 18/590,680

(22) Filed: Feb. 28, 2024

(65) Prior Publication Data

US 2024/0295944 A1  Sep. 5, 2024

(30) Foreign Application Priority Data

Mar. 2, 2023  (JP) ................................ 2023-032169

(51) Int. Cl.
| | |
|---|---|
| *G06K 9/00* | (2022.01) |
| *B60R 1/23* | (2022.01) |
| *G06F 3/04815* | (2022.01) |
| *G06F 3/04845* | (2022.01) |
| *G06F 3/0488* | (2022.01) |

(Continued)

(52) U.S. Cl.
CPC ............ *G06F 3/04815* (2013.01); *B60R 1/23* (2022.01); *G06F 3/04845* (2013.01); *G06F 3/0488* (2013.01); *G06T 15/205* (2013.01); *G06T 17/00* (2013.01); *H04N 5/265* (2013.01); *B60R 2300/105* (2013.01); *B60R 2300/303* (2013.01);
(Continued)

(58) Field of Classification Search
CPC ............. G06F 3/04815; G06F 3/04845; G06F 3/0488; G06F 3/0346; B60R 1/23; B60R 2300/105; B60R 2300/303; G06T 15/205; G06T 17/00; G06T 2200/08; G06T 2200/24; G06T 15/04; H04N 5/265; B60W 30/18009; G08G 1/165
USPC ........................................................ 701/31.4
See application file for complete search history.

(56) References Cited

U.S. PATENT DOCUMENTS

| | | | | |
|---|---|---|---|---|
| 2011/0282537 A1* | 11/2011 | Yamasaki | ............. | G06F 3/0346 701/31.4 |
| 2012/0257058 A1* | 10/2012 | Kinoshita | ............. | G08G 1/165 348/148 |

(Continued)

FOREIGN PATENT DOCUMENTS

| | | | |
|---|---|---|---|
| JP | 6370833 | B2 | 8/2018 |
| JP | 6625157 | B2 | 12/2019 |

*Primary Examiner* — Abdul-Samad A Adediran
(74) *Attorney, Agent, or Firm* — Maschoff Brennan (57) ABSTRACT

A vehicle display device includes a plurality of capturing sections, a combining section, a virtual viewpoint image generation section, a display section, a touch panel configured to receive input for changing a setting condition related to the virtual viewpoint on a virtual viewpoint image on the display section, and an image adjustment section configured to enable the virtual viewpoint to be set in the vehicle exterior or the vehicle interior and to move between the vehicle exterior and the vehicle interior, to adjust the virtual viewpoint image.

3 Claims, 5 Drawing Sheets

(51) Int. Cl.
    *G06T 15/20*     (2011.01)
    *G06T 17/00*     (2006.01)
    *H04N 5/265*     (2006.01)

(52) U.S. Cl.
    CPC ...... *G06T 2200/08* (2013.01); *G06T 2200/24* (2013.01)

(56) References Cited

U.S. PATENT DOCUMENTS

2016/0212384 A1*   7/2016   Sawada .................. G06T 15/04
2018/0253106 A1*   9/2018   Inui ................ B60W 30/18009

* cited by examiner

VEHICLE DISPLAY DEVICE AND IMAGE DISPLAY METHOD

CROSS REFERENCE TO RELATED APPLICATION

This application is based on Japanese Patent Application No. 2023-032169 filed on Mar. 2, 2023, the disclosure of which is incorporated herein by reference.

TECHNICAL FIELD

The present disclosure relates to a vehicle display device and an image display method.

BACKGROUND

As a vehicle display device, for example, a device described in a related art is known. In the vehicle display device (image generation device) of the related art, the display control section projects a plurality of captured images around the vehicle acquired by a plurality of cameras provided on the outer periphery of the vehicle onto a projection surface corresponding to a peripheral region of the vehicle to form a peripheral image. The display control section sets a virtual viewpoint outside the vehicle or inside the vehicle, combines a vehicle image (external appearance image of the vehicle or interior finishing image of the vehicle) corresponding to a sight line direction from the virtual viewpoint in the center of the peripheral image to generate a virtual viewpoint image, and displays the virtual viewpoint image on the display device.

SUMMARY

A vehicle display device includes a plurality of capturing sections, a combining section, a virtual viewpoint image generation section, a display section, a touch panel configured to receive input for changing a setting condition related to the virtual viewpoint on a virtual viewpoint image on the display section, and an image adjustment section configured to enable the virtual viewpoint to be set in the vehicle exterior or the vehicle interior and to move between the vehicle exterior and the vehicle interior, to adjust the virtual viewpoint image.

BRIEF DESCRIPTION OF DRAWINGS

Objects, features and advantages of the present disclosure will become more apparent from the following detailed description made with reference to the accompanying drawings. In the drawings.

DETAILED DESCRIPTION

As a display form of the virtual viewpoint image, a bird's-eye view mode, a circling mode, and a manual mode are provided. The bird's-eye view mode is a mode in which a virtual viewpoint is provided at any position outside the vehicle and the sight line direction is directed toward the center side of the vehicle. In addition, the circling mode is a mode in which a virtual viewpoint is provided at the driver's position in the vehicle interior and the sight line direction is continuously changed to circle around the vehicle. In addition, the manual mode is a mode in which a virtual viewpoint is provided at the driver's position in the vehicle interior, and a virtual viewpoint image in any sight line direction is displayed from the virtual viewpoint of the driver's position by the user's touch operation (flick operation) on the virtual viewpoint image on the display device.

Each of the above display modes can be switched by pressing operation (long press, once press, twice press, or the like) of an operation button provided on the steering.

However, in a related art, it is necessary to switch and set the position (each display mode) of the virtual viewpoint by pressing operation of the operation button, and it takes time and effort for the operation for display switching.

In addition, in each display mode, when a virtual viewpoint is provided outside the vehicle or when a virtual viewpoint is provided inside the vehicle, each case is only switched and displayed on a one-off basis, and thus, there is a case where it is difficult to grasp the state of the periphery with respect to the vehicle in detail.

The present disclosure provides a vehicle display device and an image display method that facilitate the movement operation of a virtual viewpoint and facilitate grasping a state around a vehicle.

According to one aspect of the present disclosure, a vehicle display device comprises: a plurality of capturing sections provided around a vehicle, the capturing sections configured to capture a periphery of the vehicle; a combining section configured to combine a plurality of images captured by the capturing sections to obtain a combined image; a virtual viewpoint image generation section configured to arrange a model of the vehicle in a central region of the combined image to generate a virtual viewpoint image viewed from a virtual viewpoint set in a vehicle exterior or a vehicle interior; a display section configured to display the virtual viewpoint image; a touch panel configured to receive input for changing a setting condition related to the virtual viewpoint by a touch operation on the virtual viewpoint image on the display section by a finger of a user; and an image adjustment section configured to, according to a movement amount and a position after movement of the finger by the touch operation, enable the virtual viewpoint to be set in the vehicle exterior or the vehicle interior and to move between the vehicle exterior and the vehicle interior, to adjust the virtual viewpoint image.

According to this disclosure, according to a movement amount and a position after movement of the finger by the touch operation, the image adjustment section enables the setting when the virtual viewpoint is set in the vehicle exterior or set in the vehicle interior, enables the virtual viewpoint to move between the vehicle exterior and the vehicle interior, and adjusts the virtual viewpoint image. Therefore, setting of a switching input section (operation button) or the like for switching the position of the virtual viewpoint between the vehicle exterior and the vehicle interior is unnecessary, and the movement operation of the virtual viewpoint can be easily performed. Furthermore, since the positions of the virtual viewpoints can be moved between the vehicle exterior and the vehicle interior, the user can more easily grasp the state around the vehicle.

According to one aspect of the present disclosure, an image display method comprises: capturing a periphery of a vehicle by a plurality of capturing sections provided around the vehicle; combining a plurality of images captured by the capturing sections to obtain a combined image; arranging a model of the vehicle in a central region of the combined image to generate a virtual viewpoint image viewed from a virtual viewpoint set in a vehicle exterior or a vehicle interior; displaying the virtual viewpoint image on a display section; and according to a movement amount and a position after movement of the finger by a touch operation on a touch panel using a finger of a user on the virtual viewpoint image on the display section, enabling the virtual viewpoint to be set in the vehicle exterior or the vehicle interior and to move between the vehicle exterior and the vehicle interior, to adjust the virtual viewpoint image.

The technical significance of this disclosure is essentially the same as that of the first disclosure, and the same action and effect as those of the first disclosure can be obtained.

Hereinafter, a plurality of modes for implementing the present disclosure will be described with reference to the drawings. In each mode, portions corresponding to the matters described in the preceding modes are denoted by the same reference numerals, and redundant descriptions may be omitted. When only a part of the configuration is described in each mode, another mode described precedingly can be applied to another part of the configuration. Not only the combination between portions explicitly described that the combination is specifically possible in each embodiment, but also partial combinations between the embodiments can be made if there is no problem in the combination in particular even when not explicitly described.

First Embodiment

Figure 1:
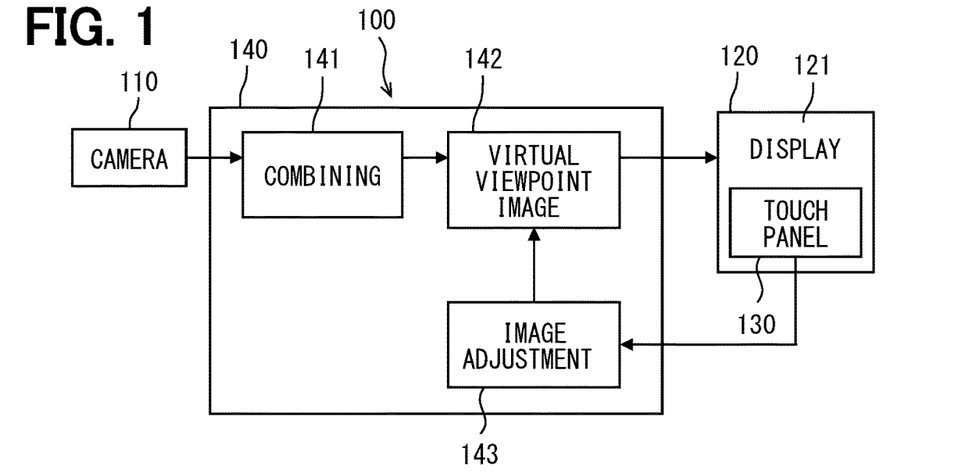
FIG. 1 is an explanatory diagram showing the overall configuration of a vehicle display device.

A vehicle display device 100 according to a first embodiment is shown in FIGS. 1 to 7. The vehicle display device 100 is mounted on the vehicle 10, and displays, on the display section 120, a virtual viewpoint image CP when virtual viewpoints VP1 and VP2 are provided in the vehicle exterior 11a or the vehicle interior 11b (FIG. 6) based on images captured by a plurality of cameras 110 provided around the vehicle 10. As shown in FIG. 1, the vehicle display device 100 includes a camera 110, a display section 120, a touch panel 130, a display control section 140, and the like.

Figure 2:
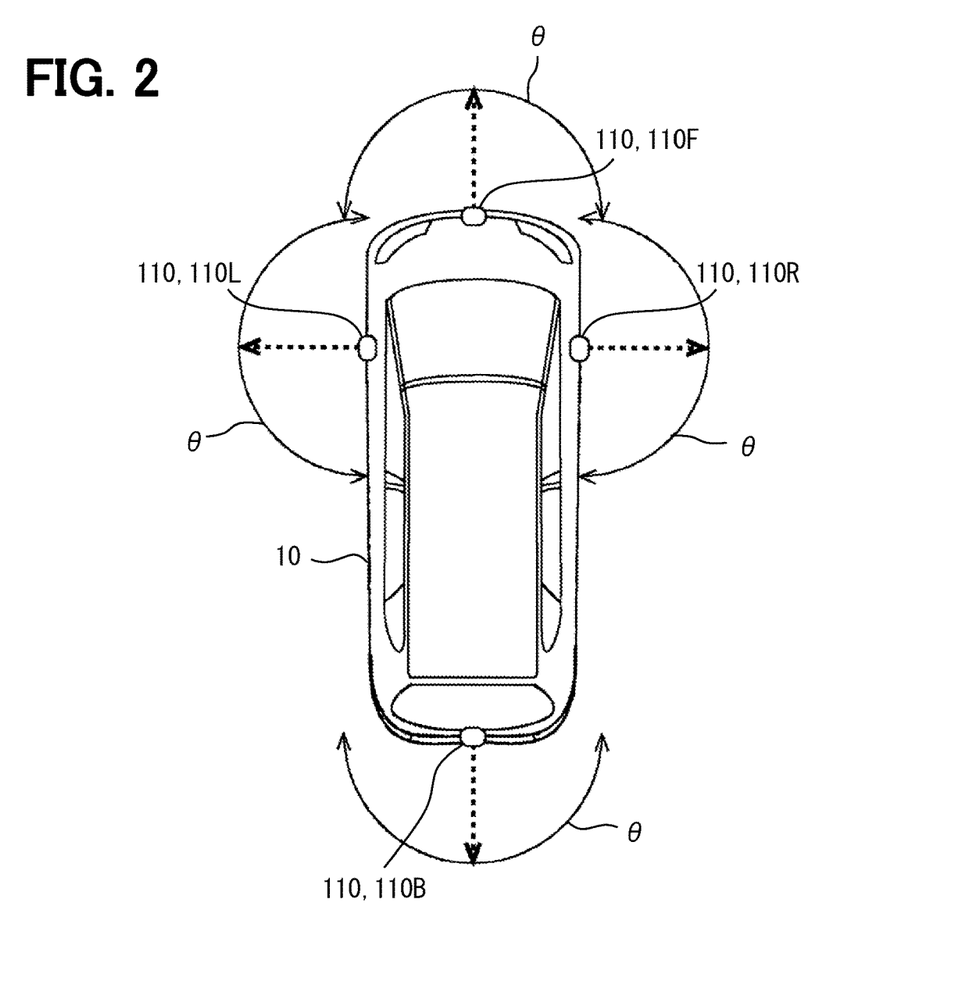
FIG. 2 is an explanatory diagram showing a plurality of cameras mounted on a vehicle and a capturing range by the cameras.

The camera 110 corresponds to the capturing section of the present disclosure, and a plurality of cameras 110 are provided around the outside of the vehicle 10. Each of the plurality of cameras 110 includes a lens and an imaging element and captures the periphery of the vehicle 10. That is, the camera 110 acquires the captured image showing the periphery of the vehicle 10. For example, as shown in FIG. 2, the camera 110 includes a front camera 110F provided at the center of the front end portion of the vehicle 10, a left side camera 110L provided at the left side mirror, a right side camera 110R provided at the right side mirror, and a rear camera 110B provided at the center of the rear end portion of the vehicle 10. The capturing of the periphery of the vehicle 10 by the camera 110 corresponds to the capturing step of the present disclosure.

The optical axis of the front camera 110F is directed forward along the front-rear direction of the vehicle 10. In addition, the optical axis of the left side camera 110L is directed to the left side along the left-right direction of vehicle 10. In addition, the optical axis of the right side camera 110R is directed to the right side along the left-right direction of vehicle 10. In addition, the optical axis of the rear camera 110B is directed rearward along the front-rear direction of the vehicle 10.

For example, as the lens of the camera 110, a wide-angle lens such as a fisheye lens is adopted, and the camera 110 has an angle of view $\theta$ of 180 degrees or more. Therefore, it is possible to capture the entire periphery of the vehicle 10 by using the four cameras 110F, 110L, 110R, and 110B.

Data of the captured image acquired by the camera 110 is output to the combining section 141 of the display control section 140.

The display section 120 is disposed, for example, at the central portion, in the left-right direction of the vehicle 10, on an instrument panel of the vehicle 10 so that the display surface 121 is in a standing attitude. As the display section 120, for example, a liquid crystal display, an organic EL display, or the like is used. The display section 120 displays a virtual viewpoint image CP (FIG. 4) to be described below for the user (driver). The display state of the virtual viewpoint image CP on the display section 120 is controlled by a display control section 140 described below.

The touch panel 130 is provided over the entire display surface 121 of the display section 120, and receives touch inputs for changing setting conditions for virtual viewpoints VP1 and VP2 (FIG. 3) to be described below based on capacitance that varies according to the proximity state of the finger at the time of a touch operation by the user's finger.

As input contents by a user's touch operation on the touch panel 130, for example, the following three types of patterns are set in advance. The first touch operation is, for example, an operation of rotating the sight line direction of the virtual viewpoints VP1 and VP2 by a swipe operation (slide operation) using one finger (index finger). The rotation operation is, for example, changing the sight line direction from the virtual viewpoints VP1 and VP2 from the lateral direction to the oblique direction. The second touch operation is, for example, an operation of moving the positions of the virtual viewpoints VP1 and VP2 by a swipe operation using two fingers (an index finger and a middle finger). The third touch operation is, for example, an operation of partially enlarging or shrinking the virtual viewpoint image CP by a pinch-out operation or a pinch-in operation using two fingers (a thumb and an index finger).

An input signal by a touch operation on the touch panel 130 is output to an image adjustment section 143 described below.

The display control section 140 is a part that controls the display state of the virtual viewpoint image CP on the display section 120, and includes a combining section 141, a virtual viewpoint image generation section 142, an image adjustment section 143, and the like.

Figure 3:
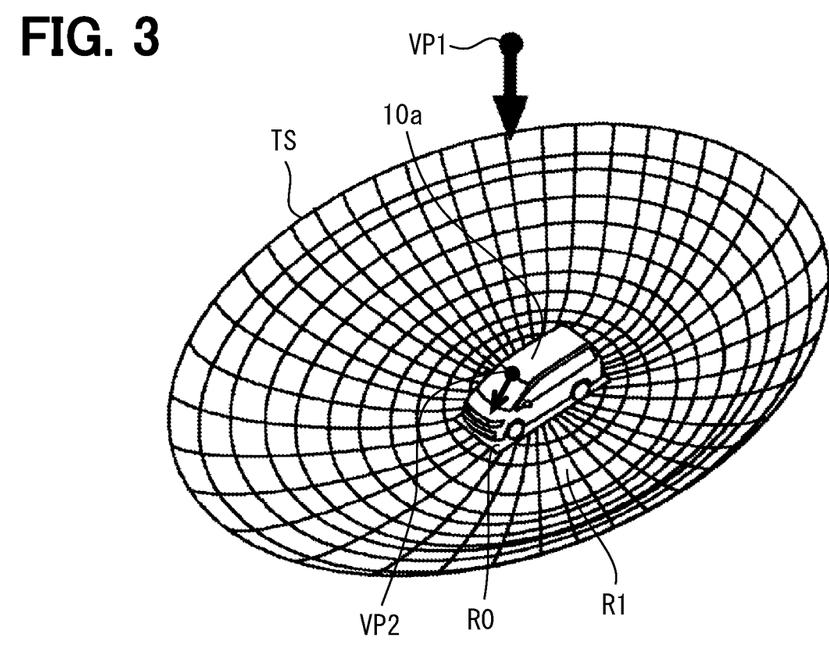
FIG. 3 is an explanatory diagram showing a generation procedure of a virtual viewpoint image.

The combining section 141 is a part that combines a plurality of captured images captured by the camera 110 so as to correspond to positions around the vehicle 10 to form a combined image. As shown in FIG. 3, the combining section 141 projects a plurality of captured images obtained from the camera 110 onto a projection surface TS which is a three-dimensional curved surface in a virtual three-dimensional space. A correspondence relationship between the position of the data included in the captured image and the position of the projection surface TS is determined in advance.

The projection surface TS has, for example, a substantially hemispherical shape (bowl shape), and its central region (bottom portion of the bowl) is defined as a vehicle region R0 to be the position of the vehicle 10. In addition, a region outside the vehicle region R0 on the projection surface TS is defined as projection region R1, and the projection region R1 corresponds to a region around the vehicle 10.

The combining section 141 outputs the combined image to the virtual viewpoint image generation section 142.

The virtual viewpoint image generation section 142 is a part that generates the virtual viewpoint image CP based on the combined image by the combining section 141.

Figure 6:
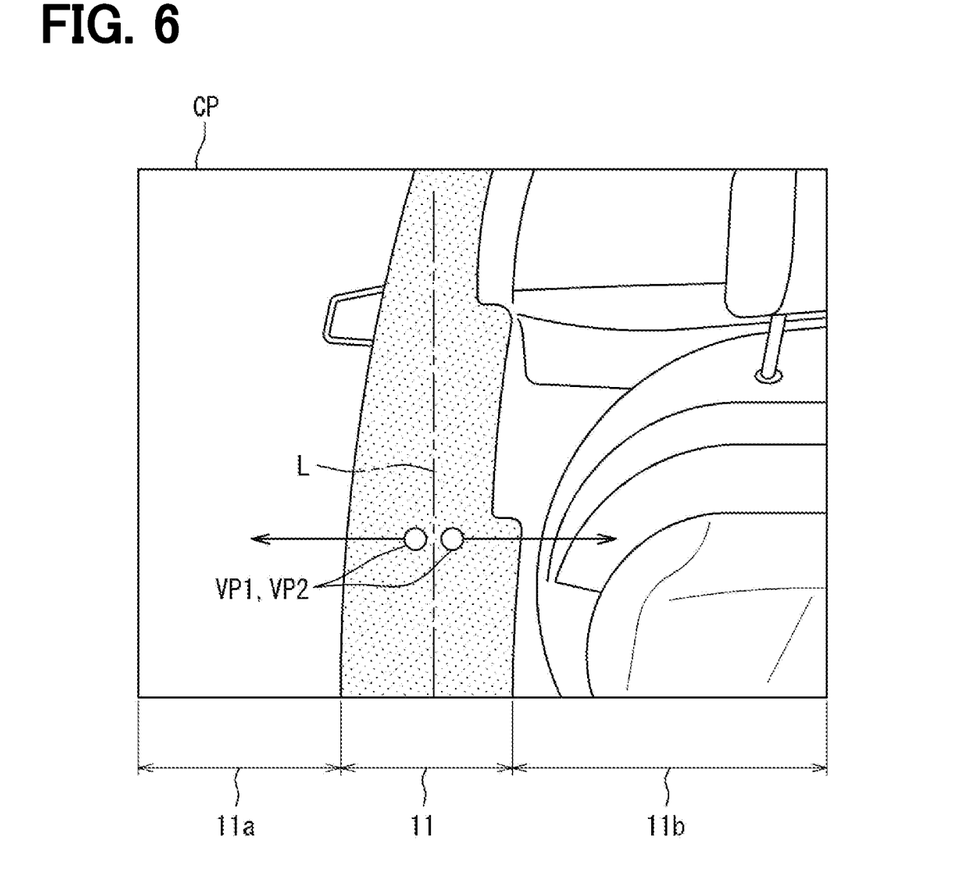
FIG. 6 is an explanatory diagram showing a moving direction of a virtual viewpoint for not allowing an outer wall of a vehicle to be displayed.

That is, the virtual viewpoint image generation section 142 disposes a vehicle model 10a, which is a model of a polygon showing the three-dimensional shape of the vehicle 10, in the central region (vehicle region R0) of the combined image. The virtual viewpoint image generation section 142 sets virtual viewpoints VP1 and VP2 in a three-dimensional space in the vehicle exterior 11a (FIG. 6) or the vehicle interior 11b (FIG. 6). The virtual viewpoint VP1 is a viewpoint set in the vehicle exterior 11a, and the virtual viewpoint VP2 is a viewpoint set in the vehicle interior 11b.

Each of the virtual viewpoints VP1 and VP2 is defined by a viewpoint position and a sight line direction. The virtual viewpoint image generation section 142 can set virtual viewpoints VP1 and VP2 having any viewpoint position and any sight line direction to a three-dimensional space.

The virtual viewpoint image generation section 142 cuts out, as an image, data projected onto a region included in a predetermined viewing angle as viewed from the set virtual viewpoints VP1 and VP2 in the projection surface TS. In addition, the virtual viewpoint image generation section 142 performs rendering on the vehicle model 10a according to the set virtual viewpoints VP1 and VP2, and superimposes a two-dimensional vehicle image as a result thereof on the cut-out image. Accordingly, the virtual viewpoint image generation section 142 generates a virtual viewpoint image CP indicating the vehicle 10 viewed from the virtual viewpoints VP1 and VP2 and a region around the vehicle 10.

Figure 4:
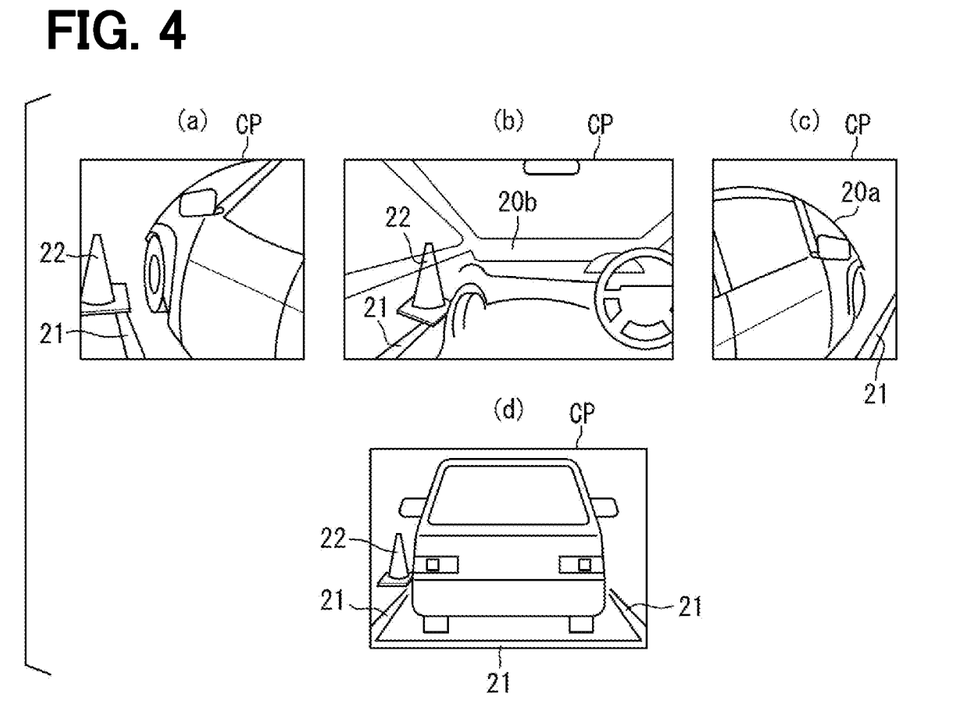
FIG. 4 is an explanatory diagram showing examples of virtual viewpoint images when virtual viewpoints are provided in the vehicle exterior and the vehicle interior.

For example, when the position of the virtual viewpoint VP1 is set to the left rear, the right rear, or the rear of the vehicle 10 in the vehicle exterior 11a, the virtual viewpoint image generation section 142 generates a virtual viewpoint image CP as shown in (a), (c), and (d) in FIG. 4. When the virtual viewpoint VP1 is set in the vehicle exterior 11a, the virtual viewpoint image CP is an image in which a vehicle image (vehicle external appearance image 20a) when the vehicle 10 is taken a bird's-eye view from the virtual viewpoint VP1 and surroundings of the vehicle 10 (parking division line 21, obstacle 22, and the like) are formed.

In addition, for example, when the position of the virtual viewpoint VP2 is set to the driver's seat in the vehicle interior 11b, the virtual viewpoint image generation section 142 generates a virtual viewpoint image CP as shown in (b) of FIG. 4. When the virtual viewpoint VP2 is set in the vehicle interior 11b, the virtual viewpoint image CP is an image in which a vehicle image (vehicle interior image 20b) when viewed from the virtual viewpoint VP2 and surroundings of the vehicle 10 (parking division line 21, obstacle 22, and the like) are formed. In this case, the surrounding image (division line 21, obstacle 22, and the like) is formed to be transmitted and visually recognized with respect to the vehicle interior image 20b.

The image adjustment section 143 is a part that adjusts the virtual viewpoint image CP in the virtual viewpoint image generation section 142 by enabling the virtual viewpoints VP1 and VP2 to be set to the vehicle exterior 11a or the vehicle interior 11b and to be moved between the vehicle exterior 11a and the vehicle interior 11b according to the movement amount of the finger by the touch operation on the touch panel 130 and the position after the movement.

Figure 5:
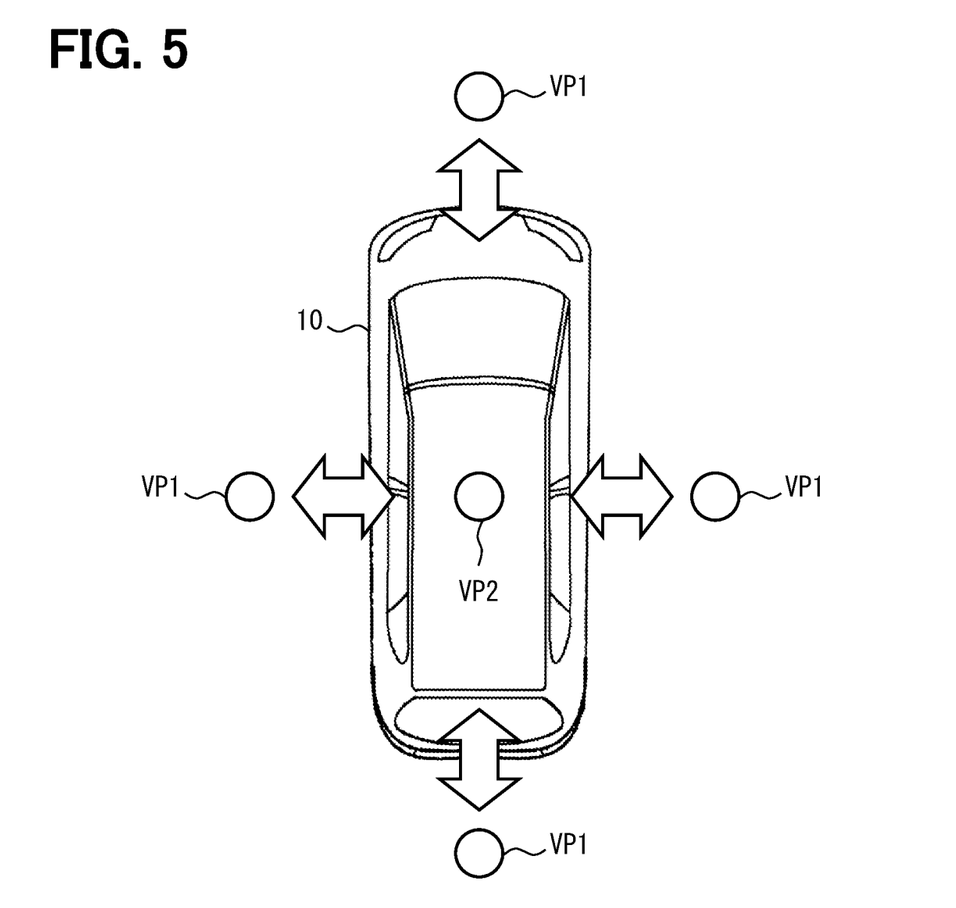
FIG. 5 is an explanatory diagram showing the setting positions of a virtual viewpoint.

The image adjustment section 143 enables the positions and sight line directions of the virtual viewpoints VP1 and VP2 to be optionally set based on an input signal of a touch operation on the touch panel 130. For example, as shown in FIG. 5, the image adjustment section 143 optionally sets the position and the sight line direction of the virtual viewpoint VP1 in the three-dimensional space in the vehicle exterior 11a. In addition, the image adjustment section 143 optionally sets the position and the sight line direction of the virtual viewpoint VP2 in the three-dimensional space in the vehicle interior 11b.

Furthermore, the image adjustment section 143 enables the virtual viewpoints VP1 and VP2 to continuously move between the vehicle exterior 11a and the vehicle interior 11b as shown by hollow arrows in FIG. 5, and optionally sets the positions and the sight line directions of the virtual viewpoints VP1 and VP2. That is, the image adjustment section 143 can move the position of the virtual viewpoint VP1 to the position of the virtual viewpoint VP2, or can move the position of the virtual viewpoint VP2 to the position of the virtual viewpoint VP1.

When the positions of the virtual viewpoints VP1 and VP2 and the sight line direction are changed based on the input signal of the touch operation, the image adjustment section 143 issues instructions to the virtual viewpoint image generation section 142 to obtain the virtual viewpoint image CP of the changed positions and sight line direction of the virtual viewpoints VP1 and VP2.

The configuration of the vehicle display device 100 of the present embodiment is as described above, and the actuation and the action and effect will be described below by adding FIG. 7.

Figure 7:
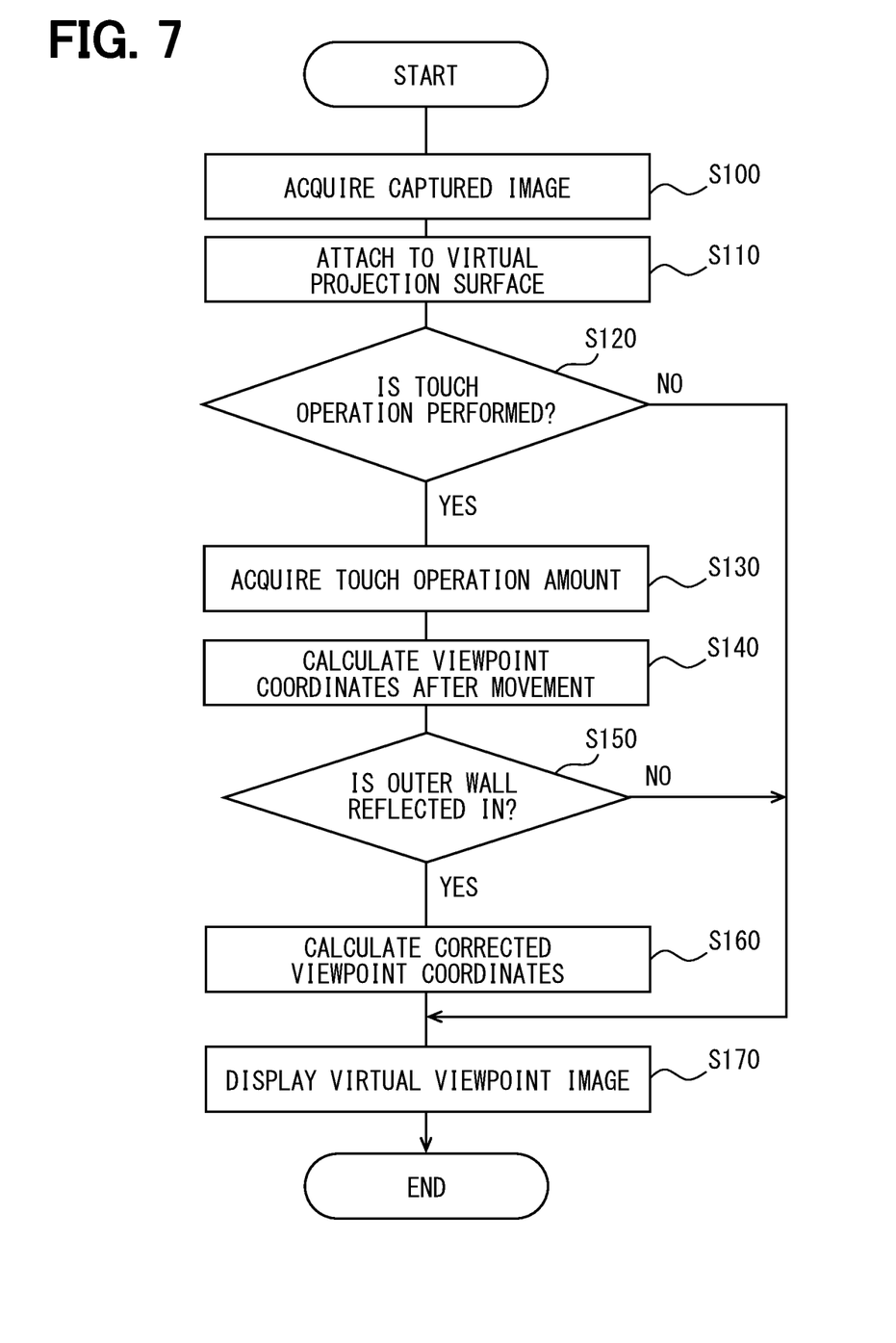
FIG. 7 is a flowchart showing contents of display control performed by a display control section.

First, in step S100 in FIG. 7, the combining section 141 of the display control section 140 acquires data on the captured image captured by the camera 110.

In step S110, the combining section 141 projects (attaches) the acquired captured image onto the projection surface TS to generate a combined image. The generation of the combined image by the combining section 141 corresponds to the combining step of the present disclosure. Furthermore, the virtual viewpoint image generation section 142 arranges the vehicle model 10a in the combined image to generate the virtual viewpoint image CP. The generation of the virtual viewpoint image CP by the virtual viewpoint image generation section 142 corresponds to the virtual viewpoint image generation step of the present disclosure.

In the virtual viewpoint VP1 at the first time of control, let the sight line direction be set immediately above the vehicle exterior 11a and at the center of the vehicle 10. That is, at the first time of control, the virtual viewpoint image CP is an image in which the vehicle 10 when taken a bird's-eye view from immediately above the vehicle 10 toward the center of the vehicle 10 as a default image and the periphery of the vehicle 10 are combined.

Next, in step S120, the image adjustment section 143 determines whether there has been a touch operation by the user (here, a swipe operation with one finger or two fingers) on the touch panel 130. That is, the image adjustment section 143 determines whether there has been an input signal from the touch panel 130. If an affirmative determination is made in step S120, the image adjustment section 143 proceeds to step S130, and if a negative determination is made, the image adjustment section 143 proceeds to step S170.

In step S130, the image adjustment section 143 acquires the movement amount (operation amount) of the finger based on the touch operation.

Furthermore, in step S140, the image adjustment section 143 acquires the position (viewpoint coordinates) after the movement of the finger based on the touch operation.

The movement amount of the finger based on the touch operation and the position after the movement correspond to a request signal from the user for changing the positions and the sight line directions of the virtual viewpoints VP1 and VP2 of the virtual viewpoint image CP currently being set.

In changing the virtual viewpoints VP1 and VP2, setting can be made when movement is made inside the vehicle exterior 11a, when movement is made inside the vehicle interior 11b, or furthermore when movement is made between the vehicle exterior 11a and the vehicle interior 11b.

Here, depending on the changed positions of the virtual viewpoints VP1 and VP2, when in the vicinity of the outer wall 11 of the vehicle 10 by a predetermined distance or less, there is a possibility that the outer wall 11 of the vehicle 10 is reflected in the virtual viewpoint image CP as shown in FIG. 6. The position in the vicinity of the outer wall 11 is the vehicle exterior 11a side of the outer wall 11, the inside of the outer wall 11, or the vehicle interior 11b side of the outer wall 11. The outer wall 11 corresponds to a cross-sectional portion of a door portion or a body portion of the vehicle 10, and is displayed as a solid black portion in the virtual viewpoint image CP. Such an outer wall 11 is not for the user to desire to visually recognize, and it is preferable to refrain from displaying.

Therefore, when the positions and the sight line directions of the virtual viewpoints VP1 and VP2 are changed, the image adjustment section 143 determines whether the changed virtual viewpoints VP1 and VP2 are in the vicinity of the outer wall 11 and the outer wall 11 of the vehicle 10 is reflected in the virtual viewpoint image CP in step S150. If an affirmative determination is made in step S150, the image adjustment section 143 proceeds to step S160, and if a negative determination is made, the image adjustment section 143 proceeds to step S170.

In step S160, the image adjustment section 143 changes (corrects) the positions of the virtual viewpoints VP1 and VP2 so that the outer wall 11 is framed out from the virtual viewpoint image CP, and calculates the coordinate positions of the virtual viewpoints VP1 and VP2 after correction.

At this time, when changing the positions of the virtual viewpoints VP1 and VP2, the image adjustment section 143 moves the changing directions of the virtual viewpoints VP1 and VP2 to the side where the viewpoint movement distance until the outer wall 11 is framed out from the virtual viewpoint image CP becomes shorter, of the vehicle exterior 11a side and the vehicle interior 11b side. That is, as shown in FIG. 6, assuming a boundary line L at the center of the outer wall 11, for example, when the virtual viewpoints VP1 and VP2 are closer to the vehicle exterior 11a side than the boundary line L, the image adjustment section 143 moves the virtual viewpoints VP1 and VP2 to the vehicle exterior 11a side. Alternatively, when the virtual viewpoints VP1 and VP2 are closer to the vehicle interior 11b side than the boundary line L, the image adjustment section 143 moves the virtual viewpoints VP1 and VP2 to the vehicle interior 11b side.

In step S170, the image adjustment section 143 instructs the virtual viewpoint image generation section 142 to display the virtual viewpoint image CP based on the corrected positions and sight line directions of the virtual viewpoints VP1 and VP2. The adjustment of the virtual viewpoint image CP by the image adjustment section 143 corresponds to the image adjustment step of the present disclosure.

When a negative determination is made in step S120, since there is no input of the user's change to the virtual viewpoints VP1 and VP2, the processing of steps S130 to S160 is not performed, and the current virtual viewpoint image CP is continuously displayed.

In addition, when a negative determination is made in step S150, since there is no possibility that the outer wall 11 is reflected in the virtual viewpoint image CP, step S160 is not performed, and the virtual viewpoints VP1 and VP2 are changed based on the results calculated in steps S130 and S140, and the virtual viewpoint image CP is changed to a virtual viewpoint image CP associated therewith.

Although not illustrated in FIG. 7, when the user's touch operation is pinch-out or pinch-in, the image adjustment section 143 instructs the virtual viewpoint image generation section 142 to enlarge or shrink a portion of the region touch-operated in the virtual viewpoint image CP, and partially enlarges or shrinks the image.

As described above, in the present embodiment, the image adjustment section 143 adjusts the virtual viewpoint image by enabling the virtual viewpoints VP1 and VP2 to be set to the vehicle exterior 11a or the vehicle interior 11b and to be moved between the vehicle exterior 11a and the vehicle interior 11b according to the movement amount of the user's finger by the touch operation on the touch panel 130 and the position after the movement.

Accordingly, it is not necessary to set a switching input section (operation button) or the like for switching the positions of the virtual viewpoints VP1 and VP2 between the vehicle exterior 11a and the vehicle interior 11b, and the user can easily perform movement operation (switching operation) of the virtual viewpoints VP1 and VP2. Furthermore, since the positions of the virtual viewpoints VP1 and VP2 can be moved between the vehicle exterior 11a and the vehicle interior 11b, the user can more easily grasp the state around the vehicle (for example, a distance between the vehicle 10 and the obstacle 22, and the like).

In addition, when the virtual viewpoints VP1 and VP2 are in the vicinity of the outer wall 11 of the vehicle 10 at a predetermined distance or less and the outer wall 11 is displayed in the virtual viewpoint image CP, the image adjustment section 143 changes the positions of the virtual viewpoints VP1 and VP2 so that the outer wall 11 is framed out from the virtual viewpoint image CP. Accordingly, it is possible to avoid the display of the outer wall 11 which is not preferable for the user.

In addition, when changing the positions of the virtual viewpoints VP1 and VP2, the image adjustment section 143 moves the changing directions of the virtual viewpoints VP1 and VP2 to the side where the viewpoint movement distance until the outer wall 11 is framed out from the virtual viewpoint image CP becomes shorter, of the vehicle exterior 11a side and the vehicle interior 11b side. Accordingly, the movement distance of the virtual viewpoints VP1 and VP2 can be further reduced, and the virtual viewpoint image CP can be displayed in a form in which the change in the image is suppressed.

The technical content of the vehicle display device 100 can also be provided as an image display method including a capturing step by the camera 110, a combining step by the combining section 141, a virtual viewpoint image generation step by the virtual viewpoint image generation section 142, and an image adjustment step by the image adjustment section 143.

Other Embodiments

The disclosure in this specification, drawings, and the like is not limited to the exemplified embodiments. The disclosure encompasses the exemplified embodiments and modified aspects based thereon by those skilled in the art. For example, the disclosure is not limited to the combinations of components and/or elements shown in the embodiments. The disclosure can be implemented with various combinations. The disclosure can have additional portions that can be added to the embodiments. The disclosure encompasses those in which components and/or elements of the embodiments are omitted. The disclosure encompasses the replacement or combination of components and/or elements between one embodiment and other embodiments. The technical scope to be disclosed is not limited to the description of the embodiments.

In addition, the display control section 140 and the method thereof described in the present disclosure may be implemented by a dedicated computer provided by configuring a processor programmed to execute one or a plurality of functions embodied by a computer program, and a memory.

Alternatively, the display control section 140 and the method thereof described in the present disclosure may be implemented by a dedicated computer provided by configuring a processor with one or more dedicated hardware theoretical circuits.

Alternatively, the display control section 140 and the method thereof described in the present disclosure may be implemented by one or more dedicated computers configured by a combination of a processor and memory which are programmed to execute one or more functions and a processor configured by one or more hardware logic circuits.

In addition, the computer program may be stored in a computer-readable non-transitory tangible storage medium as an instruction executed by a computer.

Here, a flowchart (FIG. 7) described in the present embodiment or processing of the flowchart includes a plurality of sections (or referred to as steps), and each section is expressed as, for example, S110. Furthermore, each section can be divided into a plurality of sub-sections, on the other hand, a plurality of sections can be combined into one section. In addition, each section configured in this manner can be referred to as a device, a module, or a means.

What is claimed is:

1. A vehicle display device comprising:
a plurality of capturing sections provided around a vehicle, the plurality of capturing sections configured to capture a periphery of the vehicle;
a combining section configured to combine a plurality of images captured by the plurality of capturing sections to obtain a combined image;
a virtual viewpoint image generation section configured to arrange a model of the vehicle in a central region of the combined image to generate a virtual viewpoint image viewed from a virtual viewpoint set in a vehicle exterior or a vehicle interior;
a display section configured to display the virtual viewpoint image;
a touch panel configured to receive input for changing a setting condition related to the virtual viewpoint by a touch operation on the virtual viewpoint image on the display section by a finger of a user; and
an image adjustment section configured to
(i) set the virtual viewpoint in at least one of the vehicle exterior and the vehicle interior, and
(ii) move the virtual viewpoint between the vehicle exterior and the vehicle interior to adjust the virtual viewpoint image,
based on sliding movement of the finger of the user on the display section,
wherein
when the virtual viewpoint is in a vicinity of an outer wall of the vehicle at a predetermined distance or less and the outer wall is displayed in the virtual viewpoint image, the image adjustment section changes a position of the virtual viewpoint so that the outer wall is framed out from the virtual viewpoint image, and
wherein
the image adjustment section
assumes a boundary line at a center of the outer wall, and
moves the virtual viewpoint toward the vehicle exterior when the virtual viewpoint is closer to the vehicle exterior than the boundary line, and moves the virtual viewpoint toward the vehicle interior when the virtual viewpoint is closer to the vehicle interior than the boundary line.

2. An image display method comprising:
capturing a periphery of a vehicle by a plurality of cameras provided around the vehicle;
combining a plurality of images captured by the plurality of cameras to obtain a combined image;
arranging a model of the vehicle in a central region of the combined image to generate a virtual viewpoint image viewed from a virtual viewpoint set in a vehicle exterior or a vehicle interior;
displaying the virtual viewpoint image on a display; and
setting the virtual viewpoint in at least one of the vehicle exterior and the vehicle interior or moving the virtual viewpoint between the vehicle exterior and the vehicle interior to adjust the virtual viewpoint image based on sliding movement of a finger of a user on the display,
wherein
when the virtual viewpoint is in a vicinity of an outer wall of the vehicle at a predetermined distance or less and the outer wall is displayed in the virtual viewpoint image, adjusting the virtual viewpoint image includes changing a position of the virtual viewpoint so that the outer wall is framed out from the virtual viewpoint image, and
wherein
a boundary line is assumed at a center of the outer wall of the vehicle, and
the virtual viewpoint moves toward the vehicle exterior when the virtual viewpoint is closer to the vehicle exterior than the boundary line, and the virtual viewpoint moves toward the vehicle interior when the virtual viewpoint is closer to the vehicle interior than the boundary line.

3. A vehicle display device comprising:
a plurality of cameras provided around a vehicle, the plurality of cameras configured to capture a periphery of the vehicle;
a computer configured to:
combine a plurality of images captured by the plurality of cameras to obtain a combined image; and arrange a model of the vehicle in a central region of the combined image to generate a virtual viewpoint image viewed from a virtual viewpoint set in a vehicle exterior or a vehicle interior;

a display configured to display the virtual viewpoint image; and a touch panel configured to receive input for changing a setting condition related to the virtual viewpoint by a touch operation on the virtual viewpoint image on the display by a finger of a user, wherein the computer is further configured to
- (i) set the virtual viewpoint in at least one of the vehicle exterior and the vehicle interior, and
- (ii) move the virtual viewpoint between the vehicle exterior and the vehicle interior to adjust the virtual viewpoint image, based on sliding movement of the finger of the user on the display, wherein when the virtual viewpoint is in a vicinity of an outer wall of the vehicle at a predetermined distance or less and the outer wall is displayed in the virtual viewpoint image, the computer is further configured to change a position of the virtual viewpoint so that the outer wall is framed out from the virtual viewpoint image, and wherein the computer is further configured to assume a boundary line at a center of the outer wall, and move the virtual viewpoint toward the vehicle exterior when the virtual viewpoint is closer to the vehicle exterior than the boundary line, and moves the virtual viewpoint toward the vehicle interior when the virtual viewpoint is closer to the vehicle interior than the boundary line.

* * * * *